(No Model.)
M. HARDSOCG.
CAR WHEEL.
No. 364,511. Patented June 7, 1887.
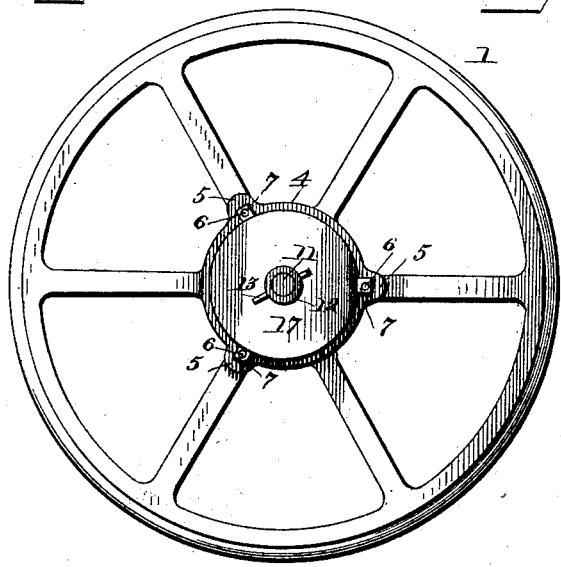
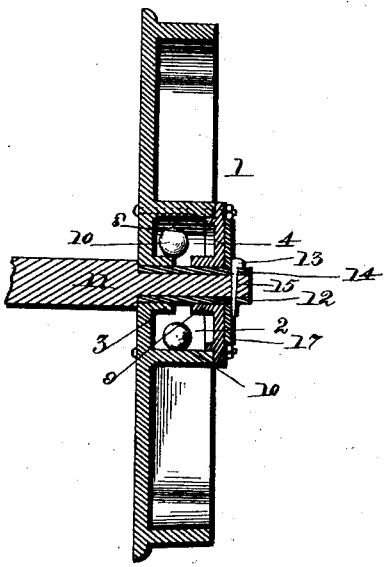
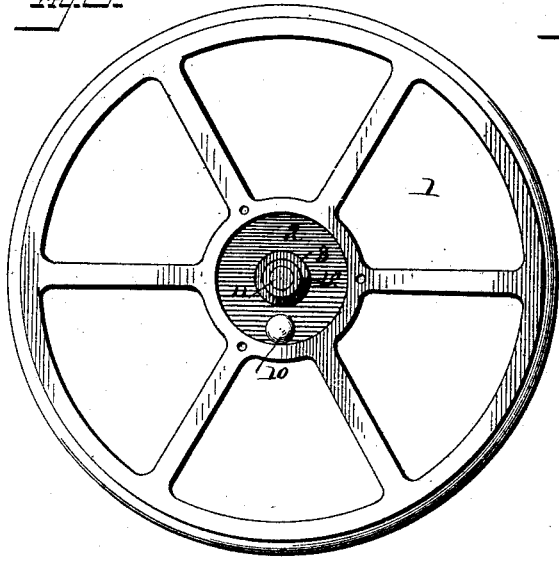
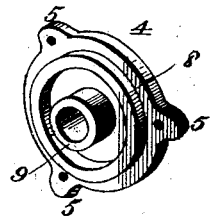
Witnesses
Geo. E. Fritsch
Benj. G. Cowl
Inventor
Martin Hardsocg
By his Attorneys
Louis Bagger & Co.

UNITED STATES PATENT OFFICE.

MARTIN HARDSOCG, OF OTTUMWA, IOWA.

CAR-WHEEL.

SPECIFICATION forming part of Letters Patent No. 364,511, dated June 7, 1887.

Application filed March 21, 1887. Serial No. 231,722. (No model.)

*To all whom it may concern:*

Be it known that I, MARTIN HARDSOCG, a citizen of the United States, and a resident of Ottumwa, in the county of Wapello and State of Iowa, have invented certain new and useful Improvements in Car-Wheels; and I do hereby declare that the following is a full, clear, and exact description of the invention, which will enable others skilled in the art to which it appertains to make and use the same, reference being had to the accompanying drawings, which form a part of this specification, and in which—

Figure 1 is a front view of my improved car-wheel. Fig. 2 is a similar view of the wheel, showing the cap removed. Fig. 3 is a vertical sectional view of the wheel and axle; and Fig. 4 is a view of the inner face of the cap.

Similar numerals of reference indicate corresponding parts in all the figures.

My invention has relation to that class of car-wheels which revolve upon the axle and in which a space is formed around the bearing of the wheel, having slots or apertures communicating with the bearing for the purpose of allowing oil to pass from the annular space into the bearing; and it consists in the improved construction and combination of parts of such a wheel, as hereinafter more fully described and claimed.

In the accompanying drawings, the numeral 1 indicates the wheel, which is formed with a central circular recess, 2, having an outwardly-projecting sleeve, 3, at its center, forming a bearing for the wheel upon the axle, and projecting less than one-half of the thickness of the wheel.

A cap, 4, is formed with perforated ears 5 in its periphery, through which ears bolts 6 pass, the said bolts passing through the wheel and having nuts 7 upon their outer ends, the said nuts bearing against the face of the cap and securing the cap over the recess, closing the same. The cap is provided upon its inner face with an annular flange, 8, which fits against the sides of the recess, and the center of the cap is formed with a sleeve, 9, similar to the sleeve in the inner side of the recess, the said sleeve upon the cap forming the other portion of the bearing for the wheel, extending with its inner end to near the end of the other sleeve, leaving a narrow annular space between it and the said sleeve.

Balls 10 are placed in the annular space formed in the recess around the sleeves, and the said balls will serve to force the fluid or semi-fluid lubricant filled into the oil space or chamber into the annular slot between the ends of the sleeve, thus lubricating the axle or thimble.

The end of the axle 11 is preferably provided with a thimble, 12, secured to the axle by means of a linchpin, 13, inserted through perforations 14 and 15 in the thimble and axle, the said pin serving at the same time to secure the wheel upon the thimble, having preferably a washer, 17, interposed between it and the face of the cap. This washer is preferably of a sufficient diameter to bear with its edge or periphery against the nuts upon the bolts securing the cap to the wheel, so that after the nuts have been screwed home upon the bolts the periphery of the washer will prevent the nuts from working off, bearing against their faces, and thus preventing them from turning. It will be seen that this thimble will take off all wear upon the axle, and when one thimble is worn out another may easily be substituted, the thimble thus saving the axle, and permitting an axle to be used for a comparatively great length of time.

By having the removable cap secured by means of the nuts upon the bolts passing through the wheel the annular oil-chamber may be easily cleaned, as the cap may be removed by removing the nuts upon the bolts, and the oil-chamber is then sufficiently opened to admit of every impurity within the chamber being removed, rendering it ready for a new charge of lubricant, which may be filled into the chamber and the cap closed, the lubricant used being preferably in a semi-fluid state.

The balls within the oil-chamber will serve to force the lubricant into the annular space or slot between the ends of the sleeves, allowing it to work out between the thimble and the bearing formed by the sleeves.

Having thus described my invention, I claim and desire to secure by Letters Patent of the United States—

1. The combination of a car-wheel having a central circular recess formed with a sleeve projecting from the center of the bottom of the recess and extending less than one-half of the thickness of the wheel, with a removable cap secured over the recess and having a central sleeve upon its inner face extending to a short distance from the other sleeve, as and for the purpose shown and set forth.

2. The combination of a car-wheel having a central circular recess formed with a short sleeve in the center of the bottom of the recess, extending less than one-half of the thickness of the wheel, a cap having perforated ears in its periphery and provided upon its inner face with an annular flange fitting within the sides of the recess, and a short central sleeve extending to a distance from the sleeve of the wheel, bolts passing through the wheel and through the ears of the cap, and having nuts bearing against the faces of the said ears, and balls within the recess, as and for the purpose shown and set forth.

3. In a car-wheel, the combination of a wheel having a circular recess in its face, a circular cap fitting over the recess and having perforated ears in its periphery, bolts passing through the wheel and through the ears and having nuts bearing against the faces of the ears, and a washer secured upon the end of the axle and having its periphery bearing against the faces of the nuts, holding them from turning, as and for the purpose shown and set forth.

4. In a car-wheel, the combination of an axle, a thimble upon the end of the axle, a wheel journaled upon the axle and having a central circular lubricating-recess, a cap covering the recess and having perforated ears secured to the face of the wheel by nutted bolts, a circular washer upon the end of the axle, having its periphery bearing against the faces of the nuts, holding them from turning, and a linchpin passing through registering perforations in the thimble and the axle and securing the washer, as and for the purpose shown and set forth.

In testimony that I claim the foregoing as my own I have hereunto affixed my signature in presence of two witnesses.

MARTIN HARDSOCG.

Witnesses:
JOHN S. SURBAUGH,
WINFIELD S. COEN.